United States Patent
Taylor, Jr. et al.

(10) Patent No.: US 10,415,256 B2
(45) Date of Patent: *Sep. 17, 2019

(54) WALL PANEL

(71) Applicant: Max Life, LLC, Salisbury, NC (US)

(72) Inventors: Charles David Taylor, Jr., Salisbury, NC (US); Paul Addison Brown, Salisbury, NC (US); Berthold Mueller, Salisbury, NC (US); Randal Hoffner, Salisbury, NC (US); Stewart Adams, Salisbury, NC (US); Jarrett B. Davis, Salisbury, NC (US)

(73) Assignee: MAX LIFE, LLC, Salisbury, NC (US)

(*) Notice: Subject to any disclaimer, the term of this patent is extended or adjusted under 35 U.S.C. 154(b) by 0 days.

This patent is subject to a terminal disclaimer.

(21) Appl. No.: 15/969,239

(22) Filed: May 2, 2018

(65) Prior Publication Data
US 2018/0251986 A1 Sep. 6, 2018

Related U.S. Application Data

(63) Continuation-in-part of application No. 15/940,174, filed on Mar. 29, 2018, and a continuation of (Continued)

(51) Int. Cl.
*E04C 1/00* (2006.01)
*E04F 13/08* (2006.01)
(Continued)

(52) U.S. Cl.
CPC .......... *E04F 13/0875* (2013.01); *B32B 3/085* (2013.01); *B32B 7/08* (2013.01); *B32B 7/12* (2013.01); *B32B 13/02* (2013.01); *B32B 13/12* (2013.01); *E04C 2/04* (2013.01); *E04F 13/075* (2013.01); *E04F 13/077* (2013.01); (Continued)

(58) Field of Classification Search
USPC ....................................................... 52/309.9
See application file for complete search history.

(56) References Cited

U.S. PATENT DOCUMENTS

| | | |
|---|---|---|
| 2,198,466 A | 4/1940 | Stolze |
| 2,825,221 A | 3/1958 | Joseph |

(Continued)

FOREIGN PATENT DOCUMENTS

DE 2361018 A1 6/1975

OTHER PUBLICATIONS

International Search Report for PCT/US2016/029954 dated Oct. 7, 2016; 10 pages.

*Primary Examiner* — Basil S Katcheves
(74) *Attorney, Agent, or Firm* — Shumaker, Loop & Kendrick, LLP

(57) ABSTRACT

A wall panel may have a layer made from magnesium oxide, a first insulation layer made from a two-part rigid urethane pour foam, and a second insulation layer made from a phase change material. The first insulation layer maybe chemically bonded to the magnesium oxide layer and may also be bonded to the phase change layer. The first insulation layer may be positioned between the second insulation layer and the magnesium oxide layer. The magnesium oxide layer may be a finished surface or a veneer layer may be applied to the magnesium oxide layer.

7 Claims, 15 Drawing Sheets

Related U.S. Application Data application No. 15/297,600, filed on Oct. 19, 2016, now Pat. No. 9,963,885, which is a continuation-in-part of application No. 15/138,638, filed on Apr. 26, 2016, now Pat. No. 9,957,722, which is a continuation of application No. 14/039,101, filed on Sep. 27, 2013, now Pat. No. 9,353,523.

(60) Provisional application No. 62/245,617, filed on Oct. 23, 2015, provisional application No. 61/706,148, filed on Sep. 27, 2012.

(51) Int. Cl.
| | |
|---|---|
| *E04F 13/075* | (2006.01) |
| *E04F 13/077* | (2006.01) |
| *B32B 3/08* | (2006.01) |
| *B32B 7/08* | (2019.01) |
| *B32B 7/12* | (2006.01) |
| *B32B 13/02* | (2006.01) |
| *B32B 13/12* | (2006.01) |
| *E04F 13/16* | (2006.01) |
| *E04F 13/14* | (2006.01) |
| *E04C 2/04* | (2006.01) |
| *E04F 13/18* | (2006.01) |
| *E04C 2/288* | (2006.01) |
| *E04C 2/00* | (2006.01) |

(52) U.S. Cl.
CPC ...... *E04F 13/0832* (2013.01); *E04F 13/0862* (2013.01); *E04F 13/0866* (2013.01); *E04F 13/0873* (2013.01); *E04F 13/14* (2013.01); *E04F 13/165* (2013.01); *E04F 13/185* (2013.01); *B32B 2260/044* (2013.01); *B32B 2262/101* (2013.01); *B32B 2607/00* (2013.01); *E04C 2/288* (2013.01); *E04C 2002/007* (2013.01)

(56) References Cited

U.S. PATENT DOCUMENTS

| | | | |
|---|---|---|---|
| 3,304,673 A | | 2/1967 | Ramoneda |
| 3,350,827 A | | 11/1967 | Sugar |
| 3,602,476 A | | 8/1971 | Iragorri |
| 3,715,417 A | * | 2/1973 | Pope ................ E04C 2/041 264/157 |
| 3,868,801 A | | 3/1975 | Weiner |
| 3,965,635 A | * | 6/1976 | Renkert ........... B28B 19/0053 52/434 |
| 4,031,682 A | | 6/1977 | Renkert |
| 4,920,716 A | | 5/1990 | Coffey |
| 5,009,387 A | | 4/1991 | Scott et al. |
| 5,836,572 A | | 11/1998 | Sugiyama |
| 5,839,251 A | | 11/1998 | Weinstein |
| 6,240,691 B1 | | 6/2001 | Holzkaemper et al. |
| 6,360,505 B1 | | 3/2002 | Johns |
| 6,516,578 B1 | | 2/2003 | Hunsaker |
| 7,165,374 B2 | | 1/2007 | Ohanesian |
| 7,641,812 B2 | | 1/2010 | Alderman |
| 7,658,050 B2 | | 2/2010 | Bouchard et al. |
| 7,871,054 B2 | | 1/2011 | Walters |
| 8,444,789 B2 | | 5/2013 | Guo |
| 8,627,625 B2 | | 1/2014 | Bouchard |
| 9,957,722 B2 | * | 5/2018 | Taylor, Jr. ................ E04C 2/04 |
| 2003/0213212 A1 | | 11/2003 | Passeno |
| 2006/0174572 A1 | * | 8/2006 | Tonyan .................. B32B 3/06 52/481.2 |
| 2008/0066412 A1 | | 3/2008 | Franco |
| 2009/0011207 A1 | * | 1/2009 | Dubey ................ C04B 20/1051 428/219 |
| 2010/0095629 A1 | * | 4/2010 | Taylor ..................... E04B 2/08 52/570 |
| 2014/0069050 A1 | | 3/2014 | Bolin |
| 2014/0083040 A1 | | 3/2014 | Taylor, Jr. et al. |
| 2014/0093679 A1 | * | 4/2014 | Okamoto ............. C09J 133/062 428/106 |
| 2014/0234560 A1 | * | 8/2014 | Miyata ................ E04D 13/1675 428/35.7 |
| 2016/0280879 A1 | * | 9/2016 | Brannum ................ C08J 9/365 |

\* cited by examiner

WALL PANEL

CROSS REFERENCE TO RELATED APPLICATIONS

This application is a Continuation-in-Part of U.S. patent application Ser. No. 15/940,174 filed on Mar. 29, 2018, which is a continuation application of U.S. patent application Ser. No. 15/297,600 filed on Oct. 19, 2016, which is a non-provisional application of U.S. Patent Application No. 62/245,617 filed on Oct. 23, 2015. The 15/297,600 application is also a continuation-in-part of U.S. patent application Ser. No. 15/138,638 filed on Apr. 26, 2016, which is a continuation of U.S. patent application Ser. No. 14/039,101 filed on Sep. 27, 2013, which is a non-provisional application of U.S. Provisional Application No. 61/706,148, filed on Sep. 27, 2012.

Accordingly, this application expressly claims priority to and incorporates by reference the entirety of U.S. patent application Ser. No. 15/940,174 filed on Mar. 29, 2018; U.S. patent application Ser. No. 15/297,600, filed on Oct. 19, 2016; U.S. Patent Application No. 62/245,617, filed on Oct. 23, 2015; U.S. patent application Ser. No. 15/138,638, filed on Apr. 26, 2016; U.S. patent application Ser. No. 14/039, 101, filed on Sep. 27, 2013, and U.S. Provisional Application No. 61/706,148, filed on Sep. 27, 2012.

TECHNICAL FIELD AND BACKGROUND OF INVENTION

The invention relates to the field of building construction materials. More particularly, the invention relates to the field of construction components used in the construction of walls, ceilings and other planar, angled and curved surfaces for buildings.

Humans have utilized bricks and other hard surfaces as construction components for buildings for thousands of years. The earliest sun-dried bricks were made in Ancient Egypt. Later, bricks were dried using a fuel source. The Book of Genesis records that burnt brick was used in the construction of the Tower of Babel. Thus, from ancient times to the present, brick has remained a popular building material.

The enduring presence of brick is due in no small part to its stellar properties as an exterior surface. Bricks are capable of resisting high summer heat, as well as, cold winters and changes there between. In addition to such thermal properties, brick provides a strong outer shell to a building. Brick resists wind, rain, snow, dust and other detrimental environmental elements. Brick can be a fire retardant surface for buildings. Bricks can be manufactured in a myriad of sizes, textures and colors. Further, though it need not be painted, when brick is painted, the paint adheres well to the brick.

However, despite such positive characteristics, brick has a few drawbacks, mostly related to installation. For instance, whereas other exterior surfaces maybe relatively easily applied to an existing building structure, brick is much more difficult to install on an existing building as an alternate siding choice during a renovation. Further, the laying of brick during the construction of a building is a labor-intensive operation. Each brick must be mortared and laid, one on another, brick-by-brick, by a skilled brick mason. As manual labor prices rise in a given market, so do the costs associated with using brick as a building material. It is also difficult or impossible to install brick during the winter because mortar does not cure well or at all in freezing temperatures.

Thus, there exists a need for a building product that has the same or better building characteristics and aesthetic appeal as traditional brick but also can be applied without the need for an extensive skilled labor team of brick masons. Further, there exists a need for a building product that has the same or better building characteristics and aesthetic appeal as traditional brick that may be used as a retrofit product for providing a siding to an existing building structure. Further, as energy costs and environmental consciousness increase, so does the demand for better insulation. Thus, there is also a need for building materials offering improved insulation of a building's envelope.

Thermal insulation is an ever expanding field. Various forms of insulation have been used including fiberglass, cellulous, and various foams among others. Recently there has been much research into the field of phase change materials which are referred to as "PCMs". PCMs are generally described in U.S. Pat. No. 7,641,812 which is directed to a Thermal Insulation with Thin Phase Change Layer.

SUMMARY OF THE INVENTION

The present invention is thus a wall panel system that exhibits many of the same characteristics as traditional brick without the need for extensive labor costs associated with traditional brick masonry. Further, the invention is not limited to new construction applications but maybe utilized in existing construction as a retrofit application.

The invention has the same aesthetic appeal as traditional brick and has the same or better engineering benefits, The invention functions as a structural element of the building, a water-resistive barrier, a fire retardant layer, an insulating envelope and an aesthetic finished exterior surface, The invention is lightweight and energy efficient.

The invention may include an outer veneer layer, a middle cement layer and an inner insulation layer.

The outer veneer layer may be thin brick, stone, tile or other such material (hereinafter referred to as "brick" unless otherwise specified) as desired for both aesthetic and engineering appeal. These maybe referred to as an architectural or aesthetic element. Alternatively, the outer veneer layer may be two parts comprising thin brick, stone, tile or other material, which is embedded in a substrate. This substrate may be polyurethane or other plastic. According to this two-part veneer layer embodiment of the invention, the brick is placed in a mold according to a desired pattern and the polyurethane, plastic or other material is pour into the mold and bonds to the brick. A finished surface of the brick will extend above the level of the poured substrate once the substrate hardens. According to another embodiment of the invention, the substrate may have sand added so that a top surface of the substrate, visible between the brick, has the appearance of mortar. In the above example, additional mortar or mortar substitute (such as sanded glue) maybe used to cover any screw holes or gaps between sections.

The middle cement layer may be glass fiber reinforced concrete. Alternatively, the middle cement layer may be magnesium oxide. The middle cement layer may be poured and cured in place or it may be sourced as a pre-fabricated product, particularly with respect to the magnesium oxide material.

The inner insulation layer may include a rigid pour foam, which may be a two-part rigid pour urethane foam.

According to one embodiment of the invention, a wall panel may include a poured substrate selected from the group consisting of polyurethane and plastic. The wall panel may further include a plurality of aesthetic elements embedded in and bonded to the poured substrate. According to such an embodiment, the aesthetic elements may be selected from the group consisting of brick, ceramic tile, porcelain tile, natural stone, engineered stone, wood, ceramic, plastic and vinyl. According to such an embodiment, a finished surface of the aesthetic elements may extend above a top surface of the poured substrate. According to such an embodiment, each one of the aesthetic elements maybe arranged in spaced-apart relation to another one of the aesthetic elements.

According to another embodiment of the invention, the wall panel may include a middle layer having a first side, which is attached to a rear surface of the poured substrate. The wall panel may also include an insulation layer having a first side chemically bonded to a second side of the middle layer, According to such an embodiment, the insulation layer may include a two-part rigid urethane pour foam the insulation layer maybe chemically bonded to the middle layer during a pour.

According to another embodiment of the invention, the middle layer may be magnesium oxide.

According to another embodiment of the invention, the middle layer may be fiber reinforced cement.

According to another embodiment of the invention, the middle layer maybe attached to the poured substrate using an attachment means such as screws, nails, bolts, welds, construction adhesive, rivets and clasps.

According to another embodiment of the invention, the wall panel maybe attached to a building structure using an attachment means such as screws, nails, bolts, welds, construction adhesive, rivets and clasps.

According to another embodiment of the invention, the poured substrate may also include sand, causing the top surface of the poured substrate to have an appearance of mortar.

According to another embodiment of the invention, the wall panel may further include sanded glue for covering imperfections in the top surface of the poured substrate and for causing the top surface of the poured substrate to have an appearance of mortar.

According to one embodiment of the invention, a wall panel may include a middle layer made from magnesium oxide. The middle layer may have a first and a second side. A veneer layer maybe attached to the first side of the middle layer. According to such an embodiment, the veneer layer may include one or more of brick, ceramic tile, porcelain tile, natural stone, engineered stone, wood, ceramic, plastic, vinyl and paint.

According to another embodiment of the invention, an insulation layer may have a first side chemically bonded to a second side of the middle layer. The insulation layer may include a two-part rigid urethane pour foam, and the insulation layer maybe chemically bonded to the middle layer during a pour.

According to one embodiment of the invention, a wall panel may include a middle layer made from a magnesium oxide. The middle layer may have a first and a second side. The wall panel may also include a veneer layer attached to the first side of the middle layer. The wall panel may also have an insulation layer. The insulation layer may have a first side chemically bonded to a second side of the middle layer. The insulation layer maybe made from a two-part rigid urethane pour foam maybe chemically bonded to the middle layer during a pour.

In one embodiment, the inner insulation layer is poured onto and is fixedly attached to the middle cement layer. The outer veneer layer is attached to the middle cement layer with mortar or other cement product. Alternatively, in the embodiment that utilizes the two-part veneer layer, the substrate of the veneer layer maybe attached to the middle cement layer via attachment screws (or nails, wall ties, or other similar attachment means). Such attachment screws, maybe positioned between spacing in the brick and extend through the substrate of the veneer layer into the cement layer and even into the insulation layer. Preferably, the screws of the veneer do not extend beyond the insulation layer in exterior applications.

According to another embodiment, the veneer layer maybe attached to the middle layer with a chemical or other construction adhesive. The adhesive may be either one part design or of multi-part design.

According to another embodiment of the invention, the veneer layer may be brick, tile, stone, engineered stone, or other such product as desired for aesthetic purposes. The mortar or other adhesive used to attach the veneer layer may also be used to grout lines between the bricks, stone, or tile of the veneer layer or another product may be applied as a grout.

According to another embodiment of the invention, the veneer layer may include spaced-apart latitudinal ridges on a rear surface of the veneer layer. Such latitudinal ridges may be narrower in width than the space between the ridges. The latitudinal ridges may create channels for moisture, gas and other fluids, which may accumulate between the veneer layer and the middle layer to escape.

According to one embodiment of the invention, in embodiments where a two-part veneer layer is not used and the brick are adhered directly to the cement layer, the middle cement layer may include relief lines or guide lines. The relief lines function to provide a guide when attaching the veneer layer to the cement layer. For example, when the veneer layer uses rectangular brick, the relief lines will be in the shape of the rectangular brick and be just larger than the perimeter of the brick such that the brick fits snuggly inside the relief lines upon application. Similarly, if stone is the veneer layer, the relief lines will match and be just larger than the perimeter of the stone to be installed.

According to another embodiment of the invention, the respective inner layer and middle cement layer are constructed into panels designed to be attached to a building frame. The panels maybe attached directly to the studs of a building or they may be attached to some other structural component of the building.

According to another embodiment of the invention, the panels are attached using screws such as structural insulated panel (SIP) screws. The SIP screws attach to the building through holes in the panel. The holes maybe countersunk so that the head of the screws is flush with the surface of the panel.

According to another embodiment, attachment points, or other items such as a PVC inlay maybe incorporated into the middle cement layer. Such items will be of a material that does not negatively affect the performance or other property of the insulation or otherwise cause a conductive source of thermal wicking.

According to another embodiment of the invention, the panels are attached using nails, construction adhesive, bolts, rivets, clasps, or other such attachment devices.

According to another embodiment of the invention, once the panels are attached to the building, the seams between the panels are sealed.

According to another embodiment of the invention, once sealed, the veneer layer is applied over the middle cement layer. In embodiments utilizing the two-part veneer layer, screws maybe used to attach the veneer layer to the middle cement layer as described above, However, in the embodiments where the brick is attached directly to the cement layer (the embodiment without the substrate in the veneer layer), during application, mortar or other attachment material is applied over the panels and the brick or other material is fitted between the relief lines, The bricks cover the holes of the SIP screws and importantly, cover the seams of the panels. Thus, there are no exposed joints or other openings of the panels.

According to another embodiment of the invention, trim pieces are applied around openings in the building envelope such as around windows and doors. These trim pieces may be in the form of headers and may include various shapes as desired for structural and aesthetic purposes. The trim pieces maybe formed in the two-part manner as described above with respect to the veneer layer. That is, the trim pieces may comprise brick embedded in a substrate. In this way, according to one manufacturing process, the brick maybe arranged in a mold and maybe coated with wax. The liquid substrate (such as polyurethane, plastic, cement, glue, or other material) maybe poured into the mold around the brick. This substrate bonds to the brick.

According to another embodiment of the invention, corner pieces are attached to the panel ends at corners of the building, or wherever corners may be required, and then brick or other material as desired is placed over the corner pieces just with the panels. The corner pieces may alternatively be formed using the two-part veneer system as described above with respect to the trim pieces and the outer veneer layer.

According to another embodiment of the invention, the panels provide a continuous insulating envelope for the walls of a structure. The inner insulation layer may be one inch and may be up to or greater than three inches thick. Such insulation may provide the panels with an insulation factor of R7 to R21 or greater depending on various factors of design.

Such an insulation regime applied to outer walls of a structure may, depending on other building and environmental factors such as zoning, building codes, etc . . . , free-up space within stud walls for other building elements such as wiring, plumbing etc. and may also reduce the size studs required for a particular building plan. For instance, whereas 2×6 or 2×8 studs may have been required to achieve a desired insulation factor, by utilizing the invention as an exterior envelope, 2×4 studs may suffice. Similarly, in a retrofit application, where an older building may have little or no insulation, significant insulation, in addition to aesthetic elements, can be gained by applying the invention to the pre-existing building.

According to another embodiment of the invention, a wall panel may have a rigid magnesium oxide layer which may have a first and a second side. The wall panel may have a first insulation layer comprising a phase change material (PCM) which may have a first and a second side. The wall panel may have a second insulation layer made from a two-part rigid urethane pour foam having a first side chemically bonded to the second side of the rigid magnesium oxide layer and second side chemically bonded to the first side of the first insulation layer.

According to another embodiment of the invention, the PCM may comprise a supersaturated solution of calcium chloride hexahydrate.

According to another embodiment of the invention, the second side of the PCM may be attachable to a fixed structural building component.

According to another embodiment of the invention, the wall panel is characterized by a lack of any additional sagging prevention layer positioned between first or second insulation layers and a fixed structural building component.

According to another embodiment of the invention, an outer veneer layer may be adhered to the first side of the rigid magnesium oxide layer.

According to another embodiment of the invention, the outer veneer layer may be selected from a group consisting of: clay brick, ceramic tile, porcelain tile, natural stone, engineered stone, paint, cement, plaster, natural stucco, and synthetic stucco.

According to another embodiment of the invention, the wall panel is attached to a building structure using an attachment selected from the group consisting of: screws, nails, bolts, welds, construction adhesive, rivets, and clasps.

BRIEF DESCRIPTION OF THE DRAWINGS FIGURES

Features, aspects, and advantages of a preferred embodiment of the invention are better understood when the detailed description is read with reference to the accompanying drawings, in which.

DETAILED DESCRIPTION

Figure 1:
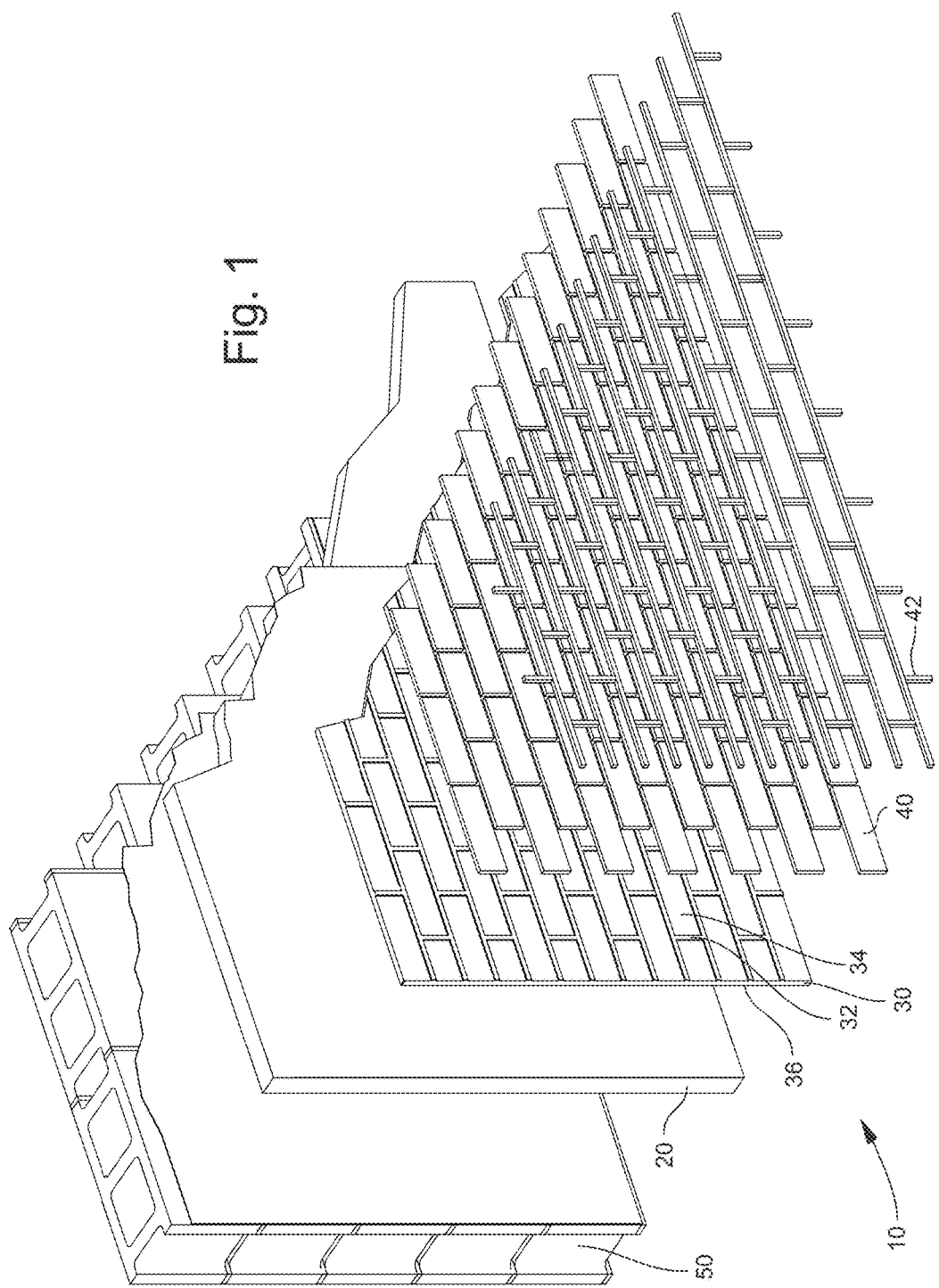
FIG. 1 is an exploded perspective view of an embodiment of the invention showing the layers.

It is to be understood by a person having ordinary skill in the art that the present discussion is a description of exemplary embodiments only and is not intended as limiting the broader aspects of the present invention. The following example is provided to further illustrate the invention and is not to be construed to unduly limit the scope of the invention.

Referring to FIGS. 1-5, the invention is an insulated wall panel 10 having three layers, 20, 30 and 40. The panel 10 provides a finished aesthetic surface to a building, a structural component to a building and an insulation factor for a building. As such, the installed wall panel 10 includes an inner insulation layer 20, a middle cement layer 30 and an outer veneer layer 40. The panel 10 maybe attached to a building wall 50.

Figure 4:
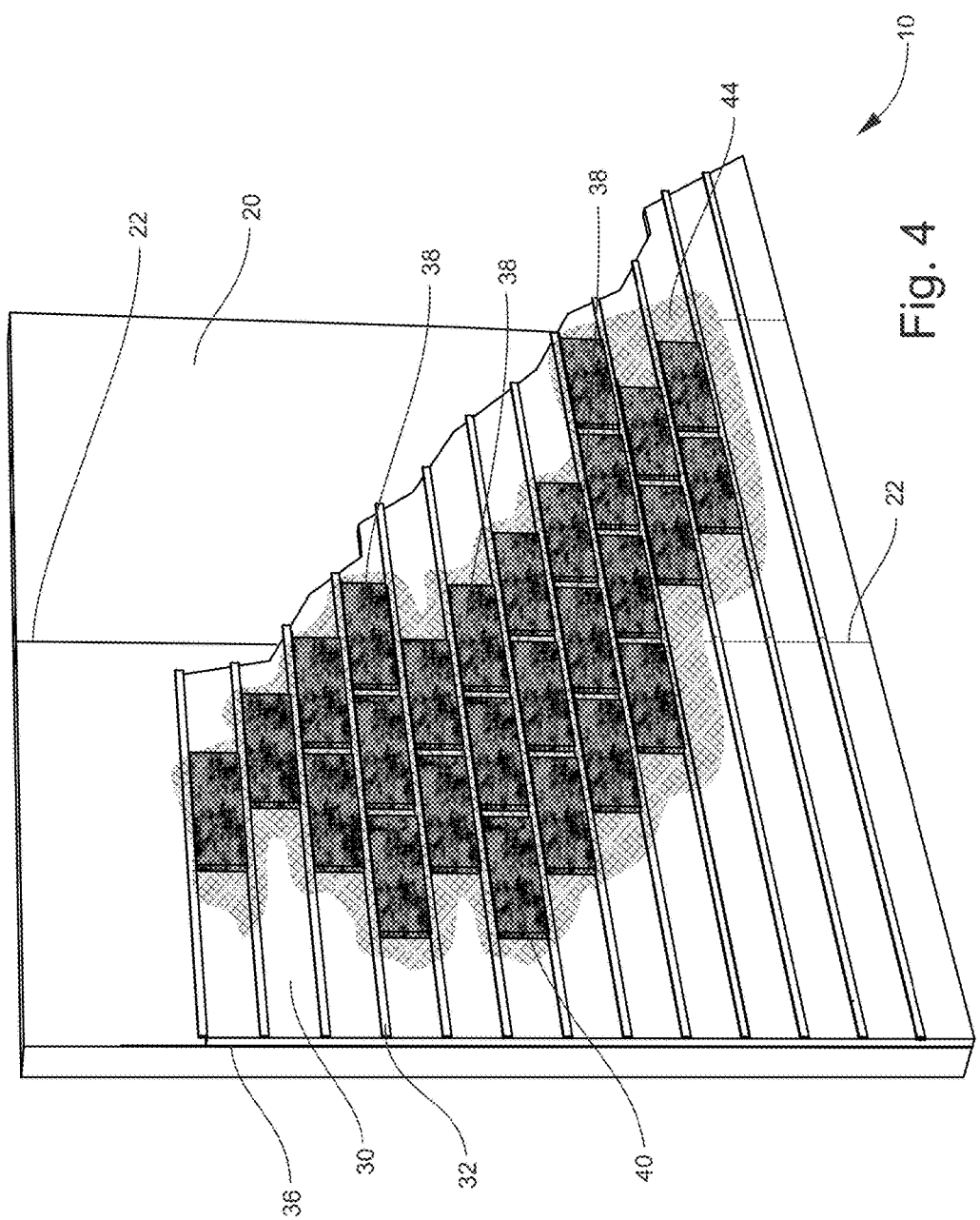
FIG. 4 is perspective view of an embodiment of the invention showing two adjacent panels with the outer veneer layer partially attached and covering the joint between the two adjacent panels.

The outer veneer layer 40 may include brick (as shown in the drawings) but may also include stone, tile, engineered stone, and/or similar material depending on desired finish effect. Thus, the use of the term "brick" herein is synonymous and inclusive of other veneers thus listed. The veneer layer 40 is relatively thin and is attached to the middle cement layer 30 using mortar 44 or other appropriate material such as a chemical adhesive as best shown in FIG. 4. Each brick (or other material as desired) of the veneer layer 40 is thin and is defined by a perimeter.

The middle layer 30 provides a substrate to which the brick of the veneer 40 is applied upon installation on a' building structure 50. The middle layer 30 has a plurality of sets of relief lines 32, Each set of relief lines 32 define a boundary that is just larger than the perimeter of a particular brick of the veneer layer 40 that is to be applied to the middle layer 30. The relief lines 32 maybe formed to the thickness of the desired grout 42 spacing between the brick of the veneer layer 40.

The middle layer 30 is made of a cementatious product with a glass fiber reinforcing material embedded therein. The glass fiber has high strength and is the principal load-carrying member of the middle layer 30 while the cement forms a matrix that allows the fibers to retain their desired location and orientation. The resultant product is thin and strong.

In order to form the middle layer 30, a mold is first constructed into which a slurry of uncured cementatious product of the middle layer 30 is poured. The mold will have the negatives of the relief lines 32 formed therein. These negatives will appear as small trenches within the mold such that when the cement cures and the middle layer 30 is removed from the mold, the relief lines 32 will protrude outward from the otherwise generally planar outer surface 34 of the middle layer. The inner surface 36 of the middle layer 30 will also be generally planar but will not have such relief lines 32. The middle layer 30 may remain in the mold while curing. Curing time is dependent upon the thickness, particulars of the mix design and the environment in which the cement is being cured. Preferably, the middle cement layer 30 is cured in a chamber.

Once cured, the middle layer 30 is then placed in a fixture that allows the inner insulation layer 20 to be applied and attached to the inner surface 36 of the middle layer 30. The inner insulation layer 20 is a rigid pour foam that is formed from a two-part Class 1 rated urethane. The foam is non-CFC and non-HCFC. The foam is applied to the inner surface 36 of the middle layer 30 using a machine calibrated to deliver proper and consistent component mix. The finished urethane material 20 will have an in place density of approximately 2.2 pounds per cubic foot. The foam 20 adheres to the middle layer 30 such that the machine delivery and mixing of the components provides for a complete bond between the middle layer 30 and inner insulation layer 20, Thus, there are no adhesives or other chemical bonding required to achieve the strength of the final insulated panel 10. The inner insulation layer 20 maybe one inch thick or up to three inches thick or greater depending on the level of insulation desired for a particular application.

Alternatively, rather than being poured, the middle layer 30 may be press-molded, extruded, vibration cast, sprayed or slip formed, If, in alternate embodiments, attachment points 54 or other items are incorporated into the structure, they are placed in the mold prior to the injection of the urethane.

Figure 2:
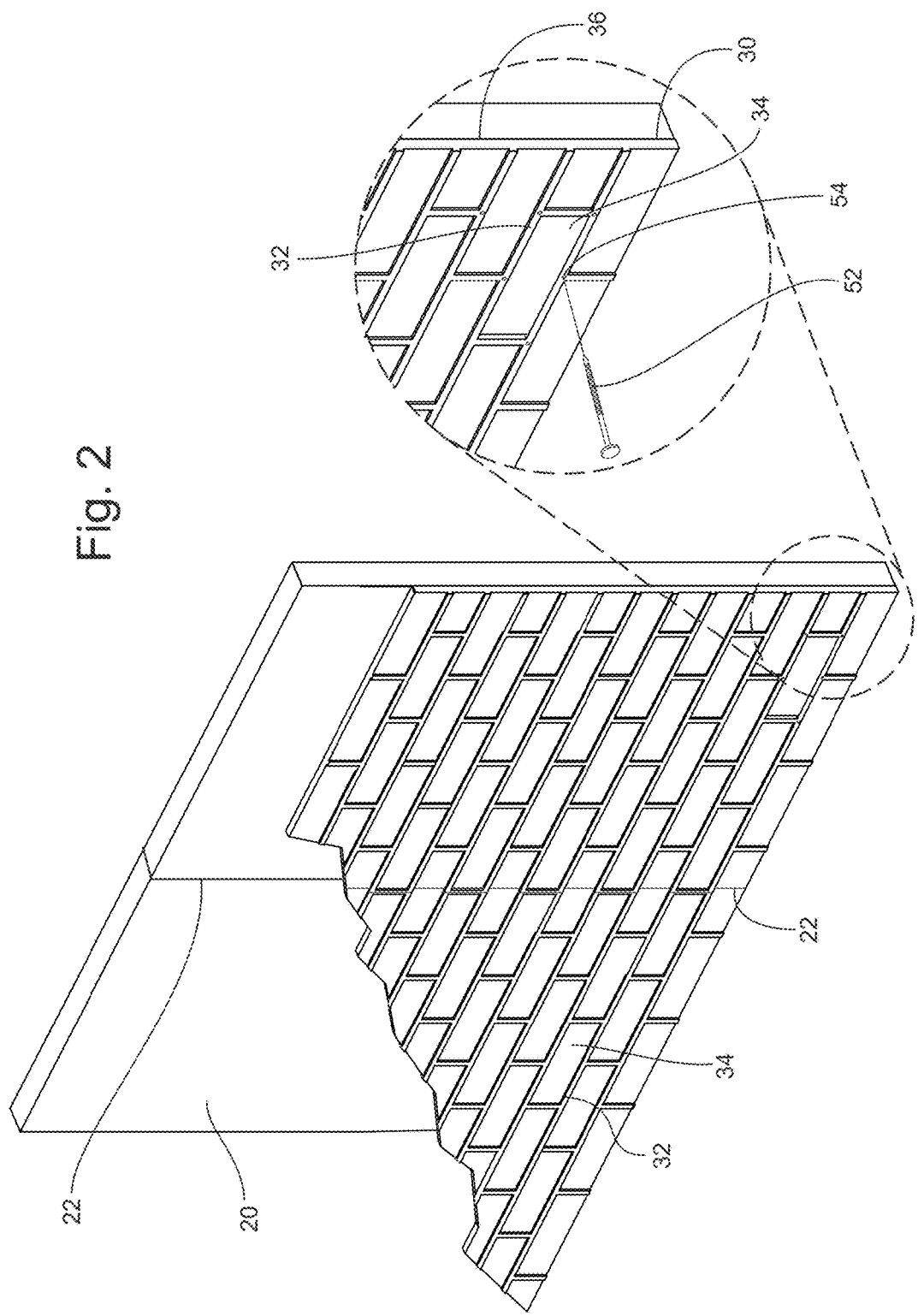
FIG. 2 is a partial perspective view of an embodiment of the invention showing two adjacent panels and highlighting the attachment of the panels to a wall.
Figure 3:
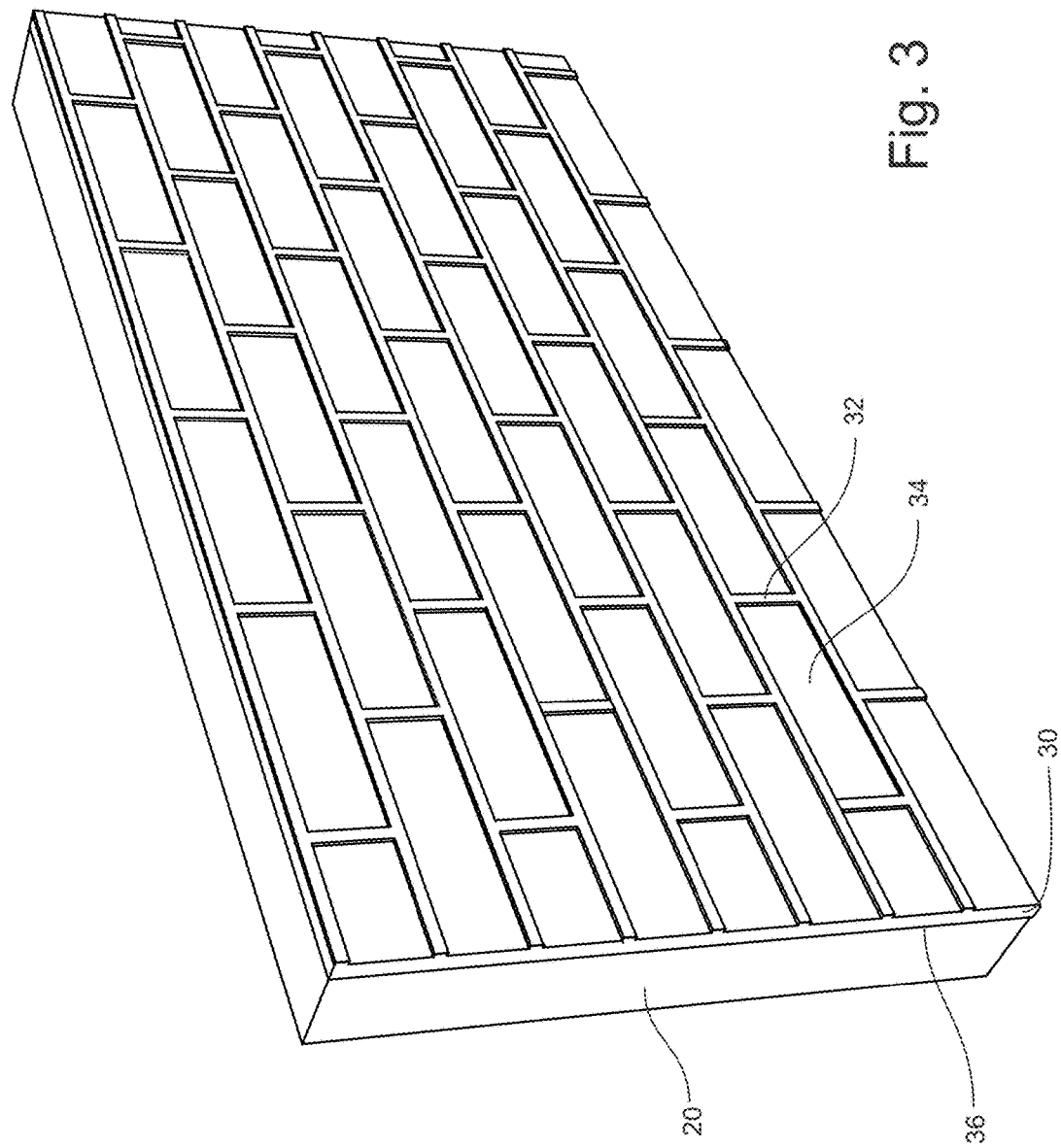
FIG. 3 is a perspective view of an embodiment of the invention showing one panel without the outer veneer layer attached.
Figure 5:
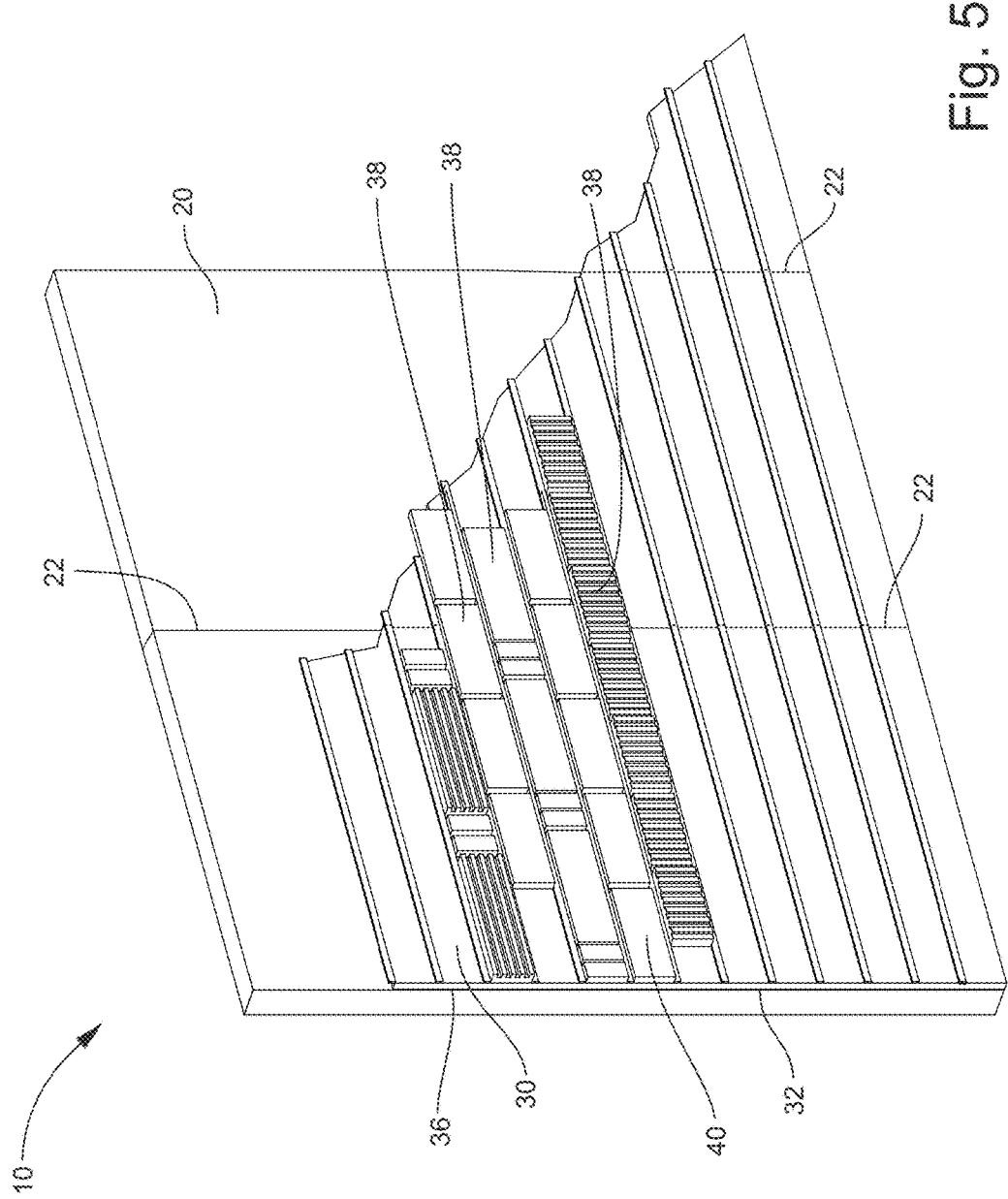
FIG. 5 is a perspective view of an embodiment of the invention showing adjacent panels with the outer, veneer layer partially attached and covering the joint between two adjacent panels.

Once the cement and urethane foam of the respective middle 30 and inner 20 layers has cured, the panel 10 is in condition for application to a building 50. As shown in FIG. 2, the panels 10 are screwed with screws 52 to the wall 50 or other structural element of a building. End pieces, headers and other trim pieces, having been similarly manufactured, are likewise attached to the building. The seams 22 between the respective panels and trim pieces are sealed with a sealing compound, such as Laticrete® Air and Water Barrier. Next, as shown in FIG. 4, an adhesive such as mortar 44 is applied to the outer surface of the middle layer 30. Next, the brick of the veneer layer 40 are applied on top of the adhesive 44 and between the relief lines 32. The brick of the veneer 40 are applied to overlap 38 the seams 22 in the panels 10. This overlapping 38 of the seams is best shown in FIGS. 4 and 5. Finally, a grout 42 or other material is applied between the gaps in the brick of the veneer 40.

Referring to FIGS. 6-12, the invention includes an embodiment 100 utilizing a two-part veneer layer 140. The top part of the veneer layer maybe brick 146 as shown. However, the invention contemplates that the concrete, tile, stone, wood, plastic, vinyl and other materials maybe utilized. As used herein, unless otherwise specified, the term "brick" will include all other such materials.

In addition to the two-part veneer layer 140, the invention may utilize a middle layer 130. This middle layer 130 maybe formed from cement or from magnesium oxide or from another composite material. Preferably, an insulating layer 120 is adhered to the middle layer 120. The inner insulation layer 120 is preferably a rigid pour foam that is formed from a two-part Class 1 rated urethane.

Figure 10:
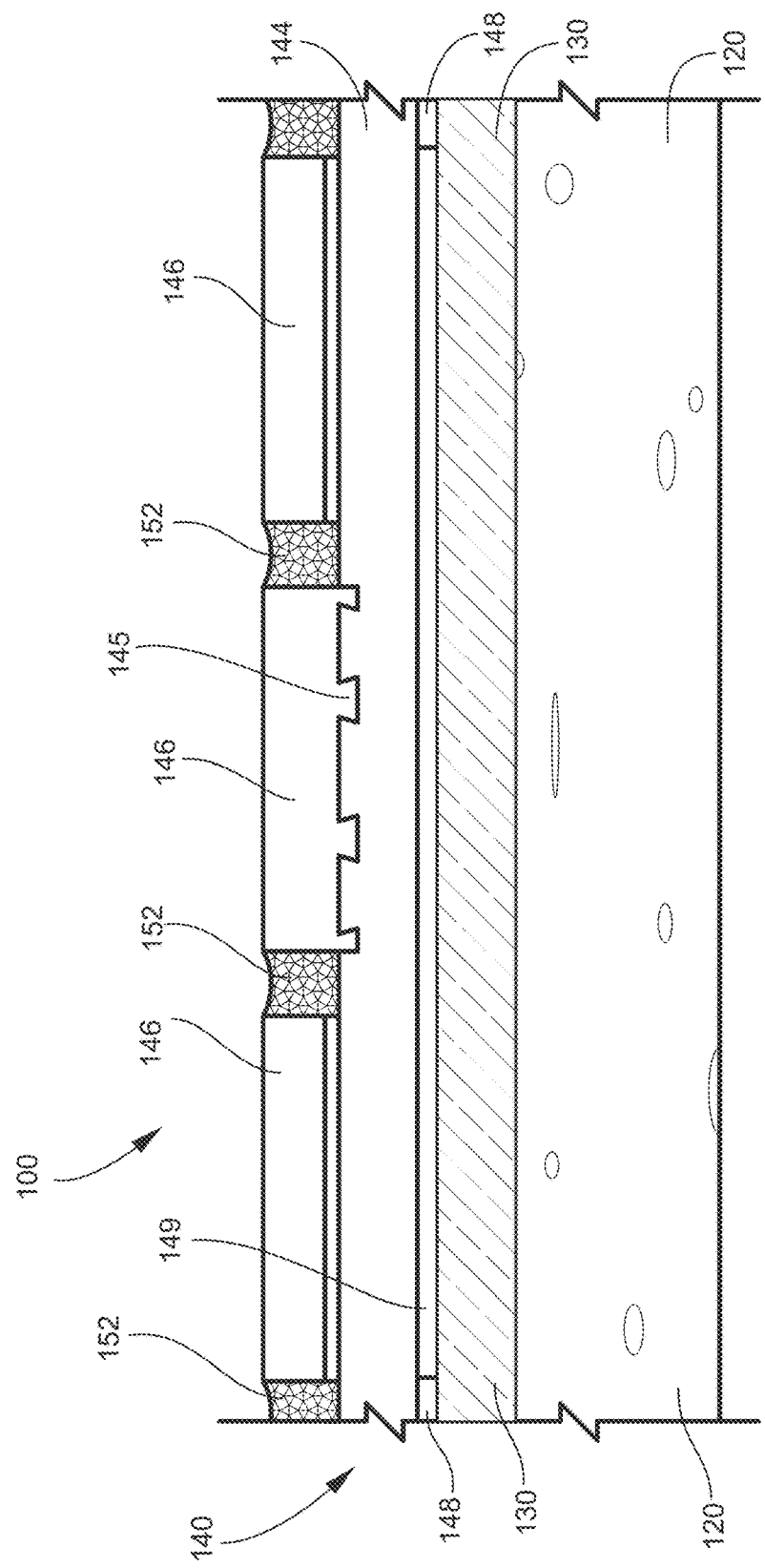
FIG. 10 is a sectional view of an embodiment of the invention showing the use of dovetailed brick.

The brick 146 is embedded in a substrate 144. This substrate 144 may be polyurethane or other plastic, cement, glass fiber reinforced concrete (GFRC), ceramic or other composite liquid product. The two-part layer is formed by having the brick 146 positioned in a mold according to desired pattern. The brick 146 maybe coated with wax or other protective coating. Sand maybe utilized as a release agent. The substrate 144 is then poured into the mold and surrounds a lower portion of the brick 146, thereby embedding the brick 146 in the substrate 144 as the substrate hardens. The brick 146 may have a smooth lower surface or may have notches, which may be dovetail notches 145 as shown in FIG. 10.

Importantly, especially for exterior application, the mold (not shown) includes a plurality of parallel grooves which, when filled with the substrate 144 form ridges 148 in the substrate 144. These ridges 148 may be seen in the assembled sectional views of FIGS. 8, 9, and 10. Between each ridge is a void 149, which forms a channel through which moisture, water and other fluids may pass between the substrate 144 and the middle cement layer 130. Such fluid may exit through weep holes (not shown), For interior application, no such void 149 may be necessary and the substrate layer 144 may not have the ridges and maybe directly attached to the middle layer 130. Likewise, for interior application, the middle layer 130 and the insulation layer 120 may not be used and the substrate may be adhered directly to an underlying construction element such as stud walls.

Figure 6:
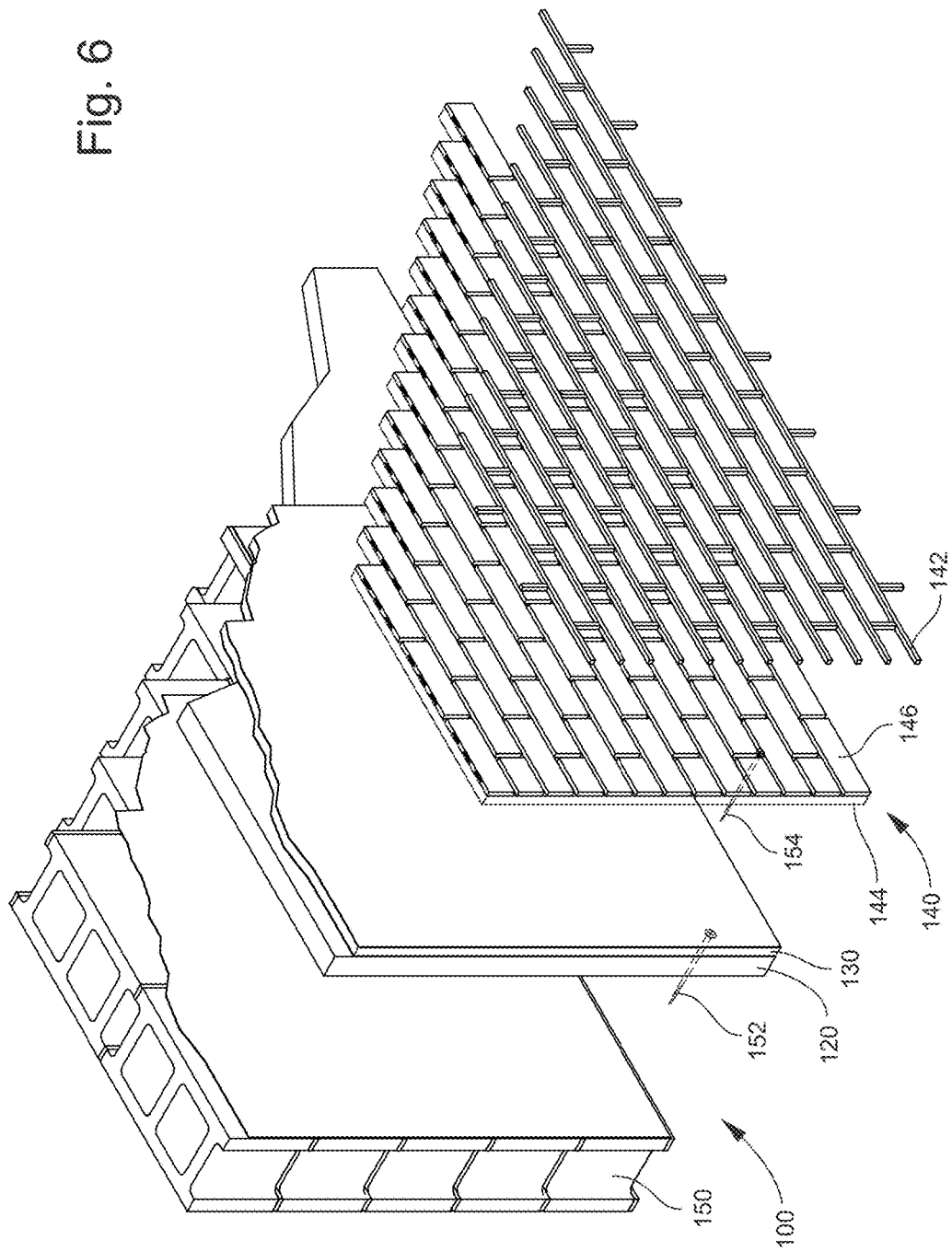
FIG. 6 is an exploded view of an embodiment of the invention showing the layers.
Figure 7:
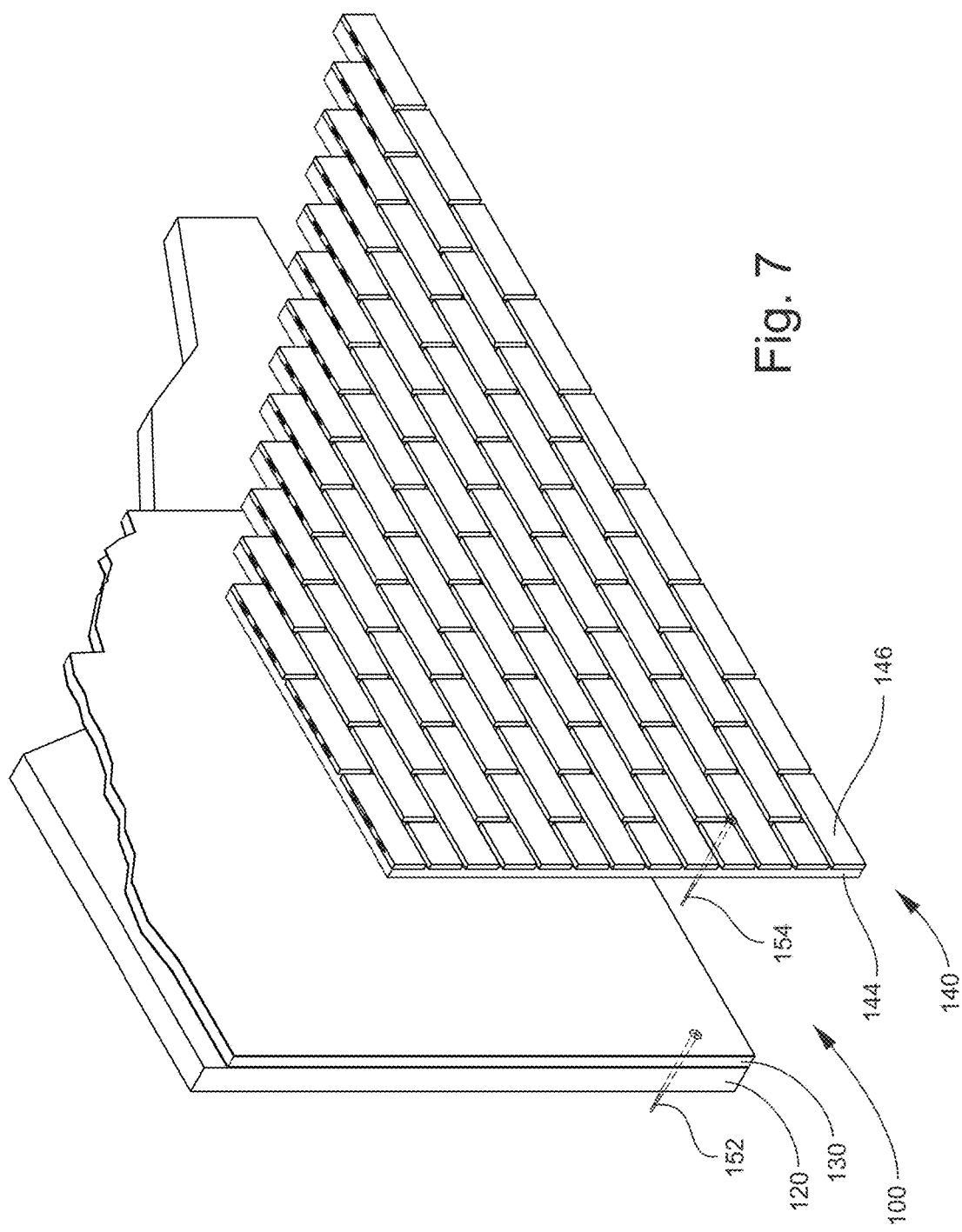
FIG. 7 is a partially exploded view of an embodiment of the invention showing the middle cement layer adhered to the insulation layer and showing the brick embedded in the substrate forming the two-part veneer layer.
Figure 8:
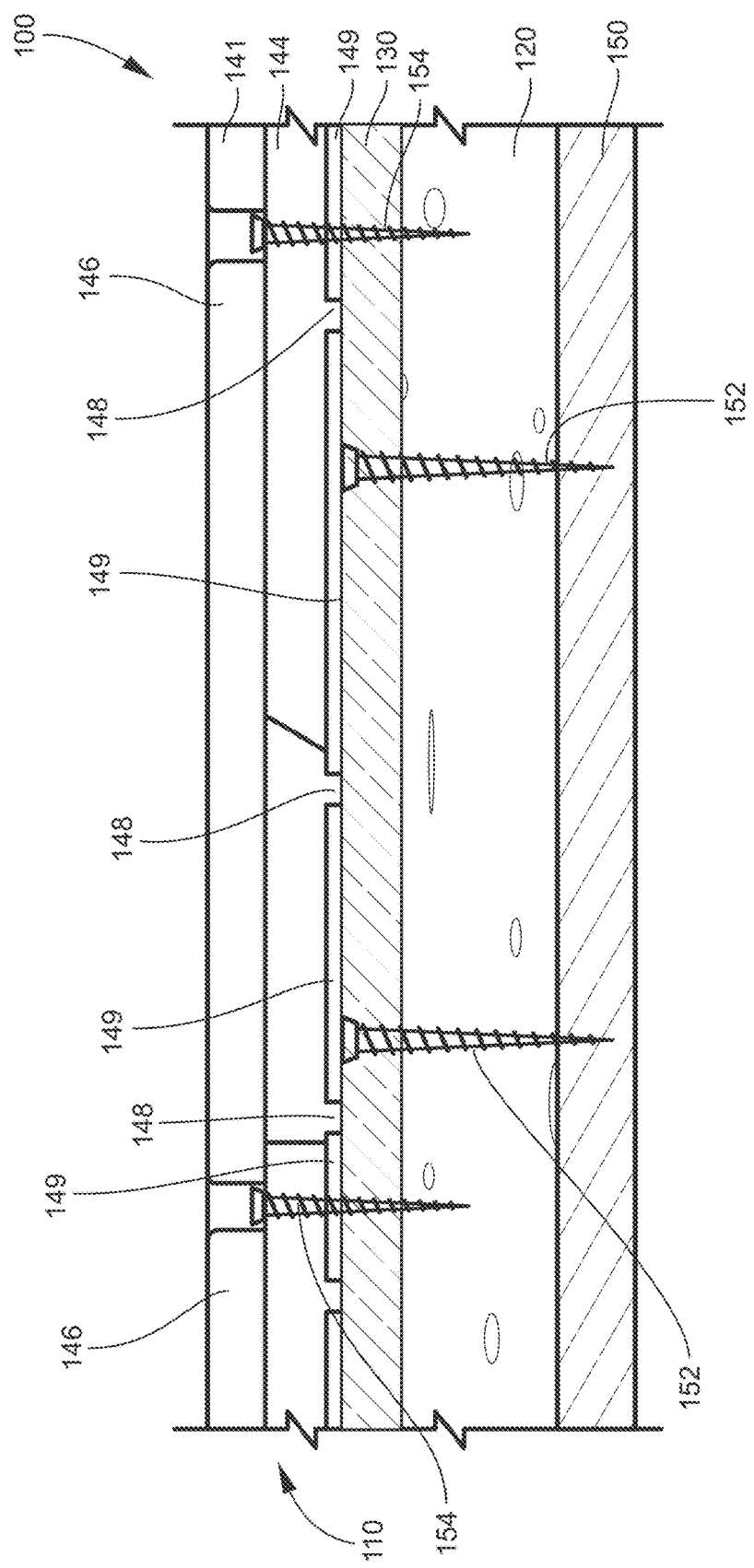
FIG. 8 is a sectional view of an embodiment of the invention attached to a planar surface.
Figure 9:
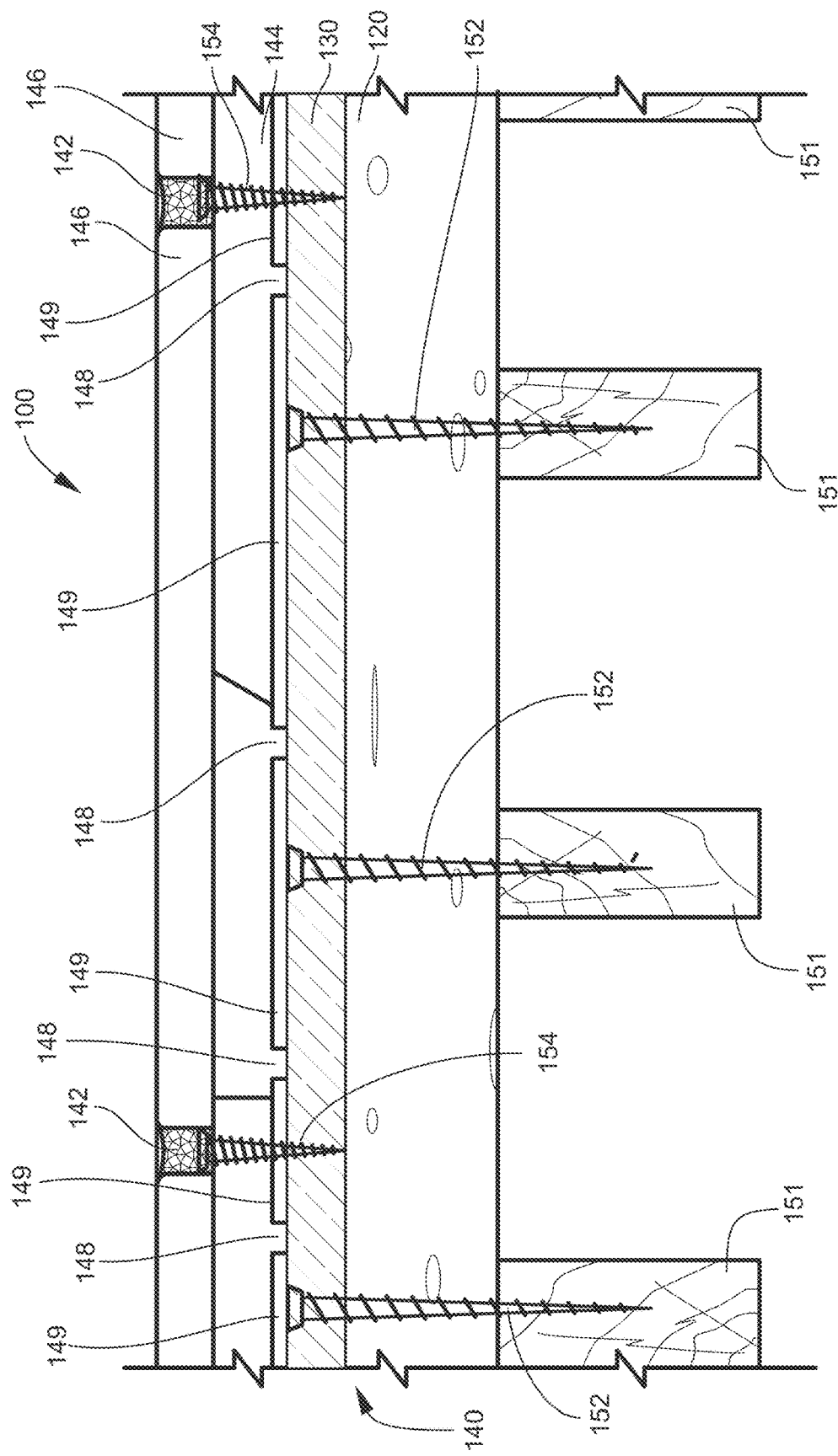
FIG. 9 is a sectional view of an embodiment of the invention attached to a plurality of studs.

In practice, the two-part veneer layer 140 may be supplied to building contractors as one element and the combination of the middle layer 130 and the insulation layer 120 may be supplied to building contractors as a second element. The second element 120, 130 may be attached via attachment means such as screws 152 to a block wall 150 as shown in FIG. 6 or studs 151 as shown in FIG. 9. The first element 140 maybe attached to the second element 120, 130 via attachment means such as screws 154. Preferably, screws 154 do not extend all the way through the second element 120, 130 so that the thermal barrier is not breached. After these first and second elements have been added to a building structure, grout/mortar 142 may be pointed into the voids between the brick 146. This grout/mortar 142 may conceal screw heads/holes 154 and joints 147 as shown in FIG. 9. Different grout/mortar joints are possible including raked, grapevine, extruded, concave, V, struck, flush, weathered, struck and convex.

Alternatively, the substrate 144 may additionally comprise a sand additive, which mimics the appearance of grout. In this embodiment, no additional grout/mortar needs to be added following installation of the top veneer layer except that a small amount of grout/mortar or an equivalent matching concealer such as caulk maybe added to conceal screw/attachment heads and/or joints between panels.

Figure 11:
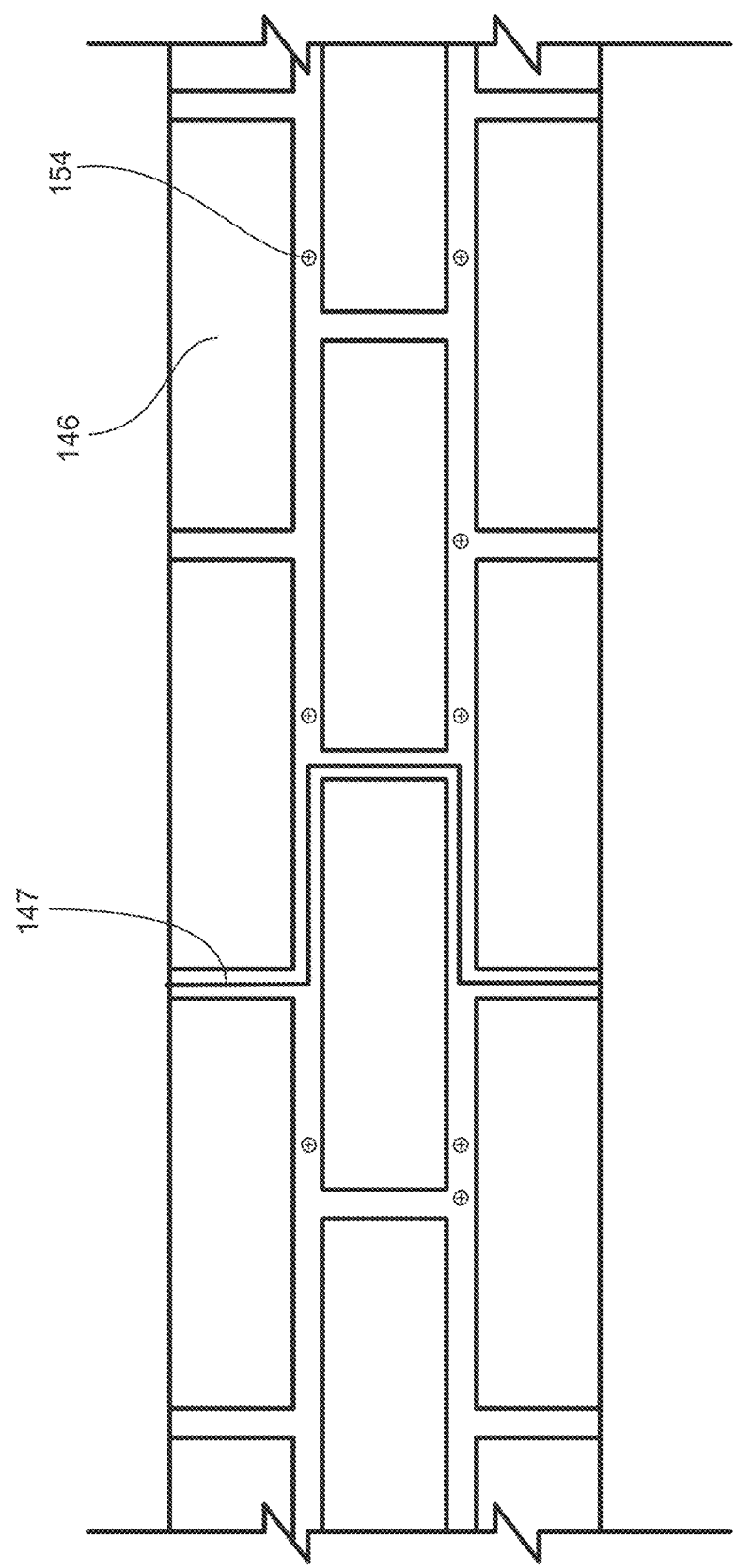
FIG. 11 is a partial front view of an embodiment of the invention showing joints between panels and attachment means.
Figure 12:
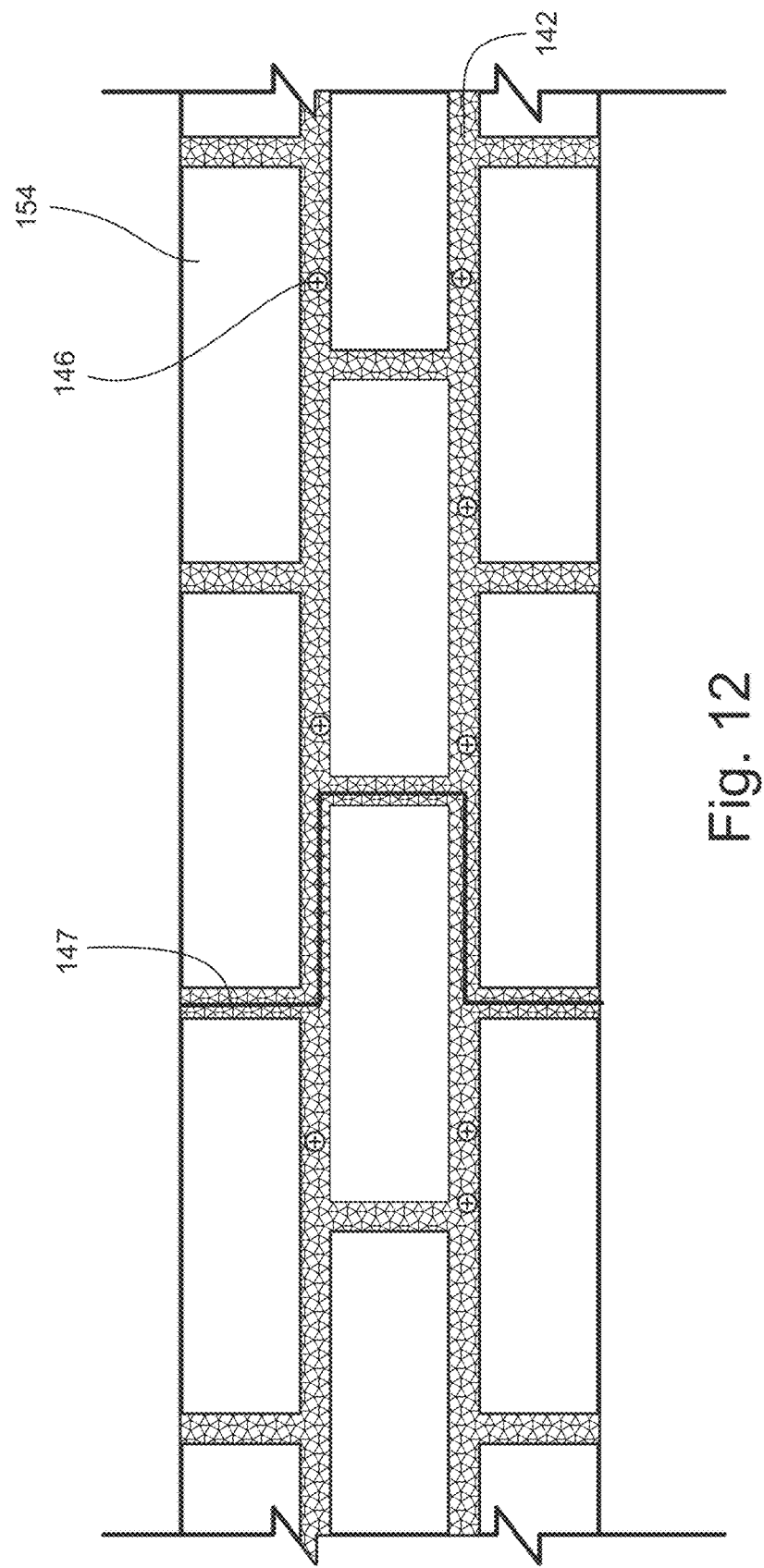
FIG. 12 is a partial front view of an embodiment of the invention showing mortar pointed between the brick and joints between panels and attachment means that have not yet been covered with mortar or other concealing compound.

The above description has contemplated use in a wall system for either exterior or interior use. However, the invention 100 contemplates use both in ceiling applications (not shown) and in paving and flooring applications (not shown). As shown in FIGS. 11 and 12, the joints between panels of the top two-part veneer layer 140 may be staggered to form an interlocking pattern. It is contemplated that panels of the invention 100 may be cut as needed in a particular application. Corners, reliefs, window edging, keystones and starter courses are also contemplated under the same methods as discussed above.

Figure 13:
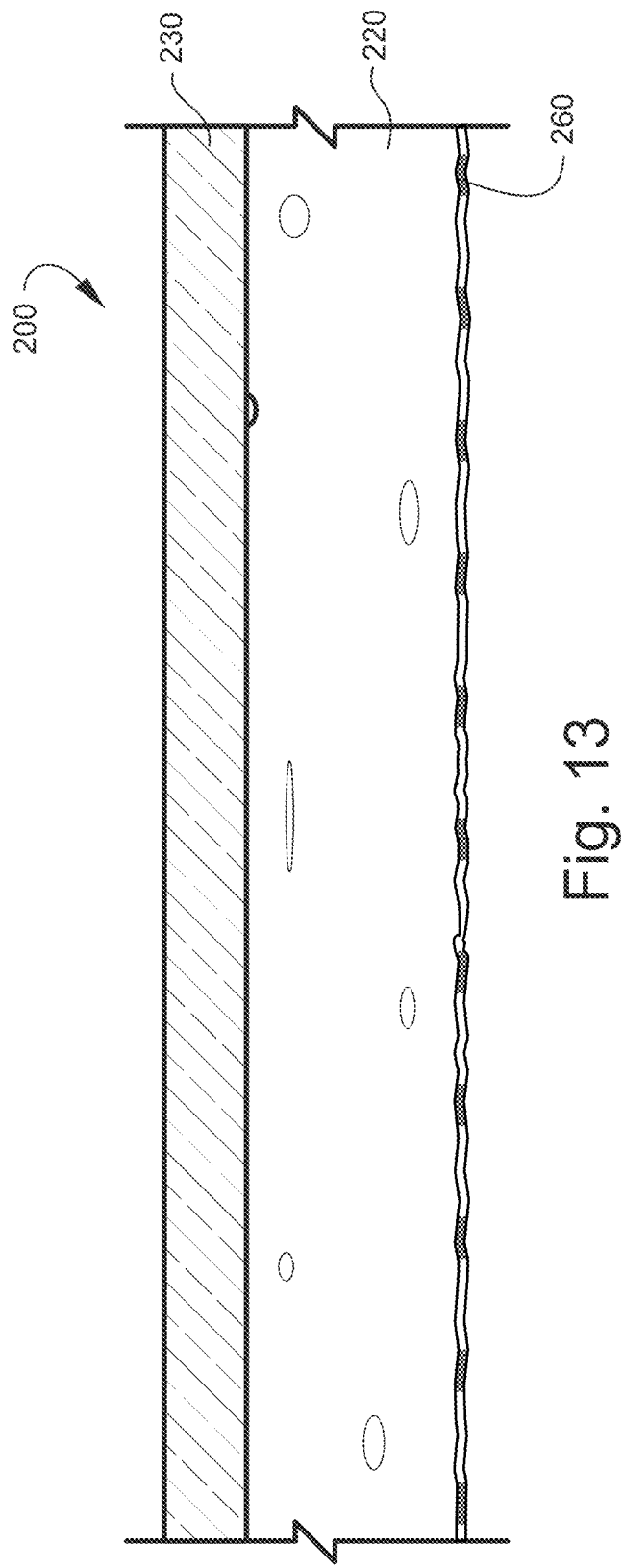
FIG. 13 is a side view of an embodiment of the invention.
Figure 14:
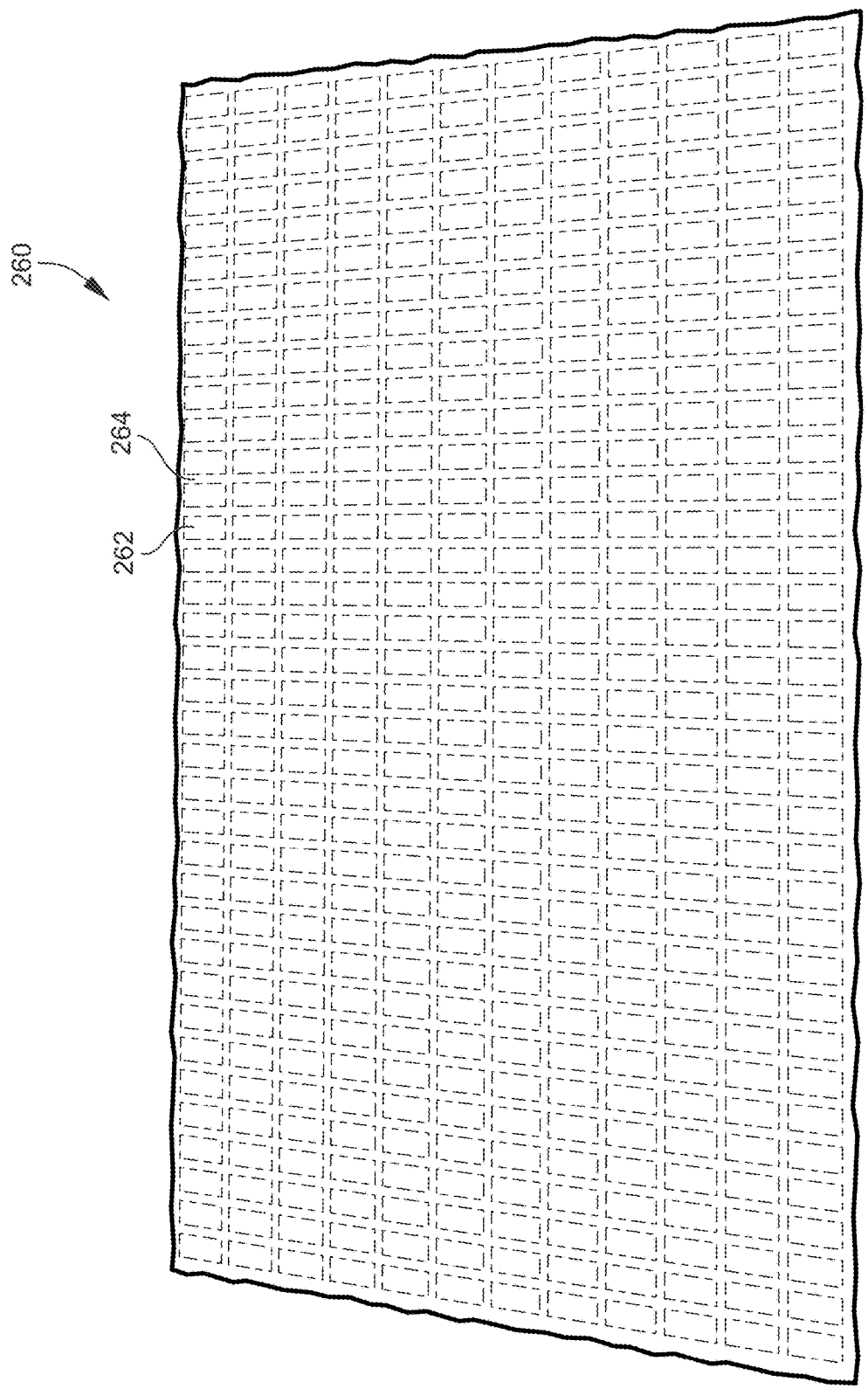
FIG. 14 is a top perspective view of the PCM layer of the invention.
Figure 15:
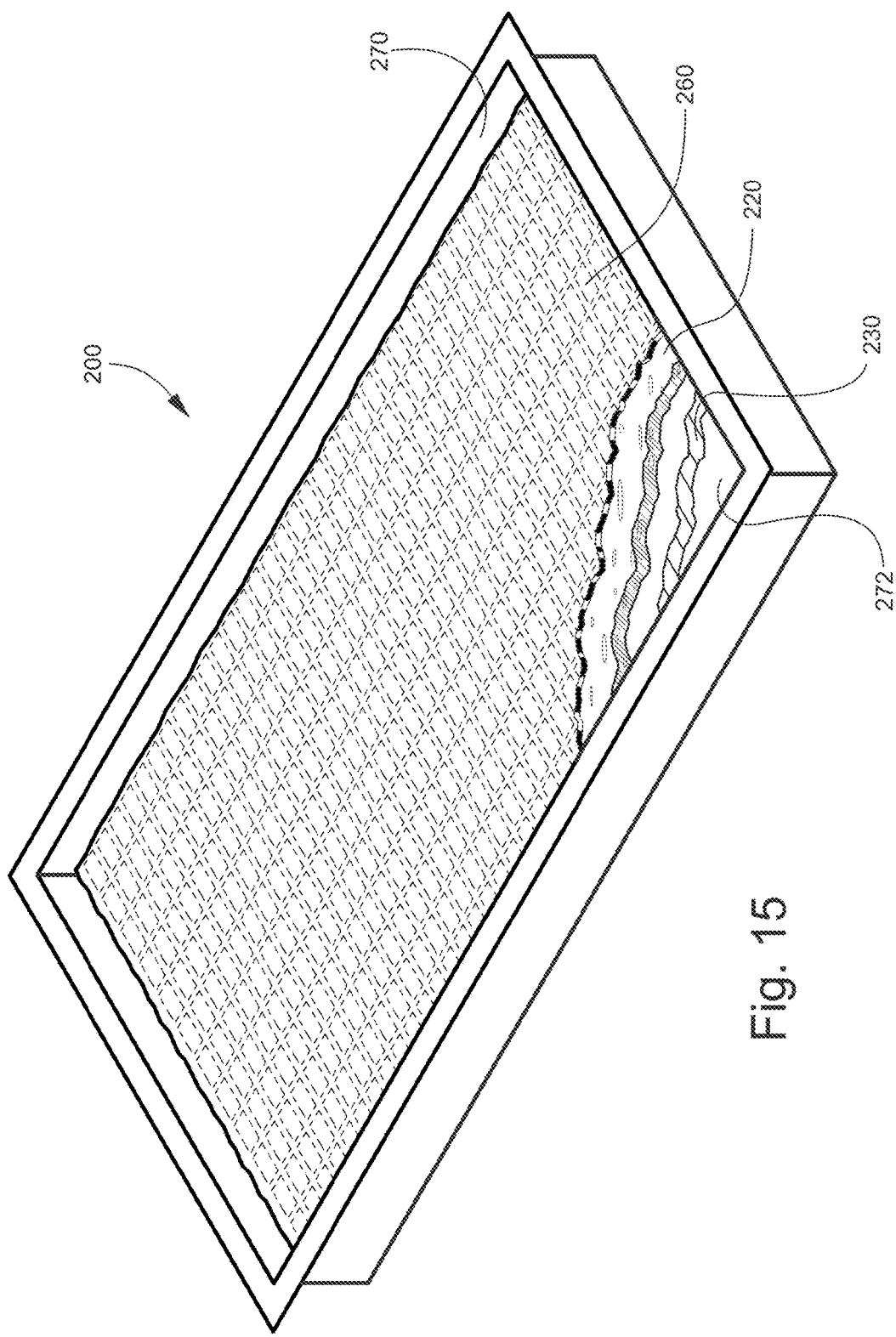
FIG. 15 is a top perspective view showing a partial cutaway view of the invention.

Referring to FIGS. 13, 14, and 15, the invention may further include an embodiment 200 utilizing a middle layer which may be a rigid magnesium oxide board 230, a first insulation layer 220 which is a two part rigid urethane pour foam, and a second insulation layer 260 which is a phase change material. The term "middle layer" is used with respect the embodiment 200 in order to be consistent with the above specification which utilizes the term "middle layer" 30, 130 in the other figures. However, middle layer 230 need not actually be in the "middle" as this embodiment 200 does not require a separate top layer or aesthetic element. Indeed, the middle layer 230 of embodiment 200 may itself also effectively function as a top layer or aesthetic element.

The second insulation layer 260 is a phase change material (PCM) as especially shown in FIG. 14. The PCM 260 has a plurality of cells 262 separated by seams 264. The cells 262 and the seams 264 may be constructed from thermoplastic materials. Most or all of the cells 262 may enclose a volume of the PCM composition. The PCM composition may include a super-saturated solution of calcium chloride hexahydrate among other compositions.

The embodiment 200 of FIGS. 13, 14, and 15 may be manufactured as shown especially in FIG. 15. A mold may be provided which has vertical sides 270 forming a continuous tray. The mold may have bottom 272. Alternatively, the magnesium oxide board 230 may also function as a bottom. The mold may also have injection ports (not shown). In order to manufacture the wall panel of embodiment 200, the magnesium oxide board 230 is first placed in the mold and the PCM material 260 is placed on top. Next, the two part rigid urethane pour foam 220 is injected between the magnesium oxide board 230 and the PCM 260. As the rigid urethane pour foam 220 cures, it forms a chemical bond with the both the magnesium oxide board 230 and the PCM 260. The chemical bond between the rigid urethane pour foam 220 and the magnesium oxide board 230, and the chemical bond between the rigid urethane pour foam 220 and the PCM 260 thus fuses all three layers together without the need for any other adhesives or attachment. The wall panel 200 may then be applied to a structural building element.

A wall panel system 10, 100, 200 according to the invention has been described with reference to specific embodiments and examples. Various details of the invention maybe changed without departing from the scope of the invention. Furthermore, the foregoing description of the preferred embodiments of the invention and best mode for practicing the invention are provided for the purpose of illustration only and not for the purpose of limitation, the invention being defined by the claims. It is envisioned that other embodiments may perform similar functions and/or achieve similar results. Any and all such equivalent embodiments and examples are within the scope of the present invention and are intended to be covered by the appended claims.

What is claimed is:

1. A wall panel comprising:
   a rigid magnesium oxide layer having a first and a second side;
   a first insulation layer comprising a phase change material (PCM) having a first and a second side; and
   a second insulation layer comprising a two part rigid urethane pour foam having a first side chemically bonded to the second side of the rigid magnesium oxide layer and a second side chemically bonded to the first side of the first insulation layer.

2. The wall panel of claim 1 wherein the PCM comprises a supersaturated solution of calcium chloride hexahydrate.

3. The wall panel of claim 1 wherein the second side of the PCM may be attachable to a fixed structural building component.

4. The wall panel of claim 1 wherein the wall panel is characterized by a lack of any additional sagging prevention layer positioned between first or second insulation layers and a fixed structural building component.

5. The wall panel of claim 1 further comprising an outer veneer layer adhered to the first side of the rigid magnesium oxide layer.

6. The wall panel of claim 5 wherein the outer veneer layer is selected from a group consisting of: clay brick, ceramic tile, porcelain tile, natural stone, engineered stone, paint, cement, plaster, natural stucco, and synthetic stucco.

7. The wall panel of claim 1 wherein the wall panel is attached to a building structure using an attachment selected from the group consisting of: screws, nails, bolts, welds, construction adhesive, rivets, and clasps.

* * * * *